United States Patent
Wu et al.

(10) Patent No.: US 9,477,892 B2
(45) Date of Patent: Oct. 25, 2016

(54) EFFICIENT METHOD OF OFFLINE TRAINING A SPECIAL-TYPE PARKED VEHICLE DETECTOR FOR VIDEO-BASED ON-STREET PARKING OCCUPANCY DETECTION SYSTEMS

(71) Applicant: Xerox Corporation, Norwalk, CT (US)

(72) Inventors: Wencheng Wu, Webster, NY (US); Edgar A. Bernal, Webster, NY (US); Yao Rong Wang, Webster, NY (US); Robert P. Loce, Webster, NY (US); Orhan Bulan, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 14/226,078

(22) Filed: Mar. 26, 2014

(65) Prior Publication Data

US 2015/0278609 A1    Oct. 1, 2015

(51) Int. Cl.
| | | |
|---|---|---|
| G06K 9/00 | (2006.01) | |
| G06K 9/46 | (2006.01) | |
| G06K 9/62 | (2006.01) | |
| G06K 9/52 | (2006.01) | |
| G06K 9/32 | (2006.01) | |

(52) U.S. Cl.
CPC ............. *G06K 9/00785* (2013.01); *G06K 9/46* (2013.01); *G06K 9/52* (2013.01); *G06K 9/6256* (2013.01); *G06K 9/6267* (2013.01); *G06K 9/3241* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 6,285,297 B1 | 9/2001 | Ball | |
| 2013/0265419 A1* | 10/2013 | Bulan et al. | 348/143 |
| 2014/0002647 A1* | 1/2014 | Xu et al. | 348/143 |

OTHER PUBLICATIONS

U.S. Appl. No. 13/922,336, entitled "A Method for Detecting Large Size and Passenger Vehicles from Fixed Cameras", filed Jun. 20, 2013, by Orhan Bulan, et al.
U.S. Appl. No. 13/835,386, entitled "Two-Dimensional and Three-Dimensional Sliding Window-Based Methods and Systems for Detecting Vehicles", filed Mar. 5, 2013, by Orhan Bulan, et al.
U.S. Appl. No. 13/836,310, entitled, "Methods and System for Automated In-Field Hierarchical Training of a Vehicle Detection System", filed Mar. 15, 2013, by Wu et al.
U.S. Appl. No. 13/932,453, entitled "System and Method for Enhancing Images and Video Frames", filed Jul. 1, 2013, by Bernal, et al.

* cited by examiner

*Primary Examiner* — Atiba O Fitzpatrick
(74) *Attorney, Agent, or Firm* — Fay Sharpe LLP

(57) ABSTRACT

A method for training a vehicle detection system used in a street occupancy estimation of stationary vehicles. The method includes defining first and second areas on an image plane of an image capture device associated with monitoring for detection of vehicles. The method includes receiving video-data from a sequence of frames captured from the image capture device. The method includes determining candidate frames that include objects relevant to a classification task in the second area. The method includes extracting the objects from the candidate frames, extracting features of each extracted object, and assigning labels to the each extracted object. The method includes training at least one classifier using the labels and extracted features. The method includes using the at least one trained classifier to classify a stationary vehicle detected in the first area.

18 Claims, 5 Drawing Sheets

EFFICIENT METHOD OF OFFLINE TRAINING A SPECIAL-TYPE PARKED VEHICLE DETECTOR FOR VIDEO-BASED ON-STREET PARKING OCCUPANCY DETECTION SYSTEMS

BACKGROUND

The present disclosure relates to a video-based method and system for training a vehicle detection system used in a street occupancy estimation of stationary vehicles using samples collected from a surrogate region proximately located to the area of interest. The disclosure finds application in a parking occupancy detection system. However, it is appreciated that the present exemplary embodiments are also amenable to other like applications, such as vehicle detection and traffic management systems.

A video-based parking management system monitors select parking areas to provide real-time vehicle detection and parking occupancy data. One area that is monitored by the system can include on-street parking lanes which extend along a curb on a street. Video cameras are installed nearby for continuously monitoring the parking area. The cameras provide video feed to a system processor, which analyzes the video data for providing a user with any one of vehicle occupancy, parking availability, vehicle orientation, and parking violation information, etc.

A parking occupancy detection system localizes a parked vehicle within a candidate region where a vehicle is known to potentially exist. While the system can detect passenger vehicles with high accuracy, it may partially detect and/or miss larger-sized vehicles, such as commercial vehicles.

A recently proposed method and system improves accuracy by inputting the detected vehicle features to separate classifiers, each trained offline using samples of passenger and special-type vehicles. The classifiers are trained using vehicles detected in the monitored area of interest. However, because the fraction of larger-sized and special-type vehicles is typically very small relative to passenger vehicles for a street parking area of interest, the performance of detecting these vehicles decreases when a small number of samples is used for training a classifier dedicated to detection of larger-sized and special type vehicles.

The offline training of a classifier for a larger and special-type vehicle type can be time consuming due to the scarcity of positive training samples. A typical training stage requires at least several hundred positive (i.e., special type vehicles) and negative (i.e., other-type vehicles or backgrounds) training samples. A sufficient number of positive training samples from special-type parked vehicles can take a long time to collect due to their relative scarcity. In other words, the training is prolonged because of the small sample size of special-type vehicles appearing in the area of interest. Undesired delays may significantly affect large-scale deployments of a technology where training has to be completed before a system goes live. The training is necessary; however, because one missed detection of a special-type vehicle can result in system error or a missed parking violation. A missed detection can furthermore prevent useful information from being provided to users, such as where the special-type vehicle is an emergency vehicle responding to a situation.

Fortunately, the vehicles travelling along a traffic lane near a monitored on-street parking area are typically present at a much higher rates and have similar poses compared to the stationary vehicles parked in the parking area. Accordingly, a method is desired for improving a speed of the offline training stage of classifiers—particularly by increasing the sample size available for the special-type vehicle classifier.

INCORPORATION BY REFERENCE

The disclosure of co-pending and commonly assigned U.S. Ser. No. 13/922,336, entitled "A Method for Detecting Large Size and Passenger Vehicles from Fixed Cameras", filed Jun. 20, 2013, by Orhan Bulan, et al., is totally incorporated herein by reference.

The disclosure of co-pending and commonly assigned U.S. patent application Ser. No. 13/835,386, entitled "Two-Dimensional and Three-Dimensional Sliding Window-Based Methods and Systems for Detecting Vehicles", filed Mar. 5, 2013, by Orhan Bulan, et al., is totally incorporated herein by reference.

The disclosure of co-pending and commonly assigned U.S. Ser. No. 13/441,269, entitled "A System and Method for Available Parking Space Estimation for Multispace On-Street Parking", filed Apr. 6, 2012, by Orhan Bulan, et al., is totally incorporated herein by reference.

The disclosure of co-pending and commonly assigned U.S. Ser. No. 13/932,453, entitled "System And Method For Enhancing Images And Video Frames", filed Jul. 1, 2013, by Bernal, et al., is totally incorporated herein by reference.

The disclosure of co-pending and commonly assigned U.S. patent application Ser. No. 13/836,310, filed Mar. 15, 2013, entitled, "Methods And System For Automated In-Field Hierarchical Training Of A Vehicle Detection System", by Wu et al., which is totally incorporated herein by reference.

BRIEF DESCRIPTION

One embodiment of the disclosure relates to a method for training a vehicle detection system used in a street occupancy estimation of stationary vehicles. The method includes defining first and second areas on an image plane of an image capture device associated with monitoring for detection of vehicles. The method includes receiving video-data from a sequence of frames captured from the image capture device. The method includes determining candidate frames that include objects relevant to the classification task in the second area. The method includes extracting the objects from the candidate frames, extracting features of each extracted object, and assigning labels to each extracted object. The method includes training at least one classifier using the extracted features of the labeled objects. The method includes using the at least one trained classifier to classify a stationary vehicle detected in the first area.

One embodiment of the disclosure relates to a system for training a vehicle detection system used in a street occupancy estimation of stationary vehicles. The system includes a computer including a memory and a processor adapted to execute a video buffering module, a vehicle detection module, and a training module. The video buffering module is operative to receive video-data from a sequence of frames captured from the image capture device. The vehicle detection module is operative to define first and second areas on an image plane of an image capture device associated with monitoring for detection of vehicles. The vehicle detection module is further operative to determine candidate frames that include objects relevant to the classification task in the second area, and extract the objects from the candidate frames. The training module is operative to extract features of each extracted object, assign labels to each extracted object, and train at least one classifier using the extracted features of the labeled objects. The system further includes a classifier operative to classify a stationary vehicle detected in the first area.

DETAILED DESCRIPTION

The present disclosure relates to a video-based method and system for training a vehicle detection system used in a street occupancy estimation of stationary vehicles using samples collected from a surrogate region proximately located to an area of interest. More specifically, an area of interest is being monitored by the vehicle detection system for purposes of managing space and/or enforcing laws. In the contemplated embodiment, the area of interest is a parking area. The surrogate region is an area where samples are pulled for training a classifier. In the contemplated embodiment, the surrogate region is an area experiencing heavier traffic flow, particularly where traffic is continuously moving. In the discussed embodiment, this area is located near the enforcement area so the sample pool can include vehicle types most likely to use the enforced and/or managed area.

Figure 1:
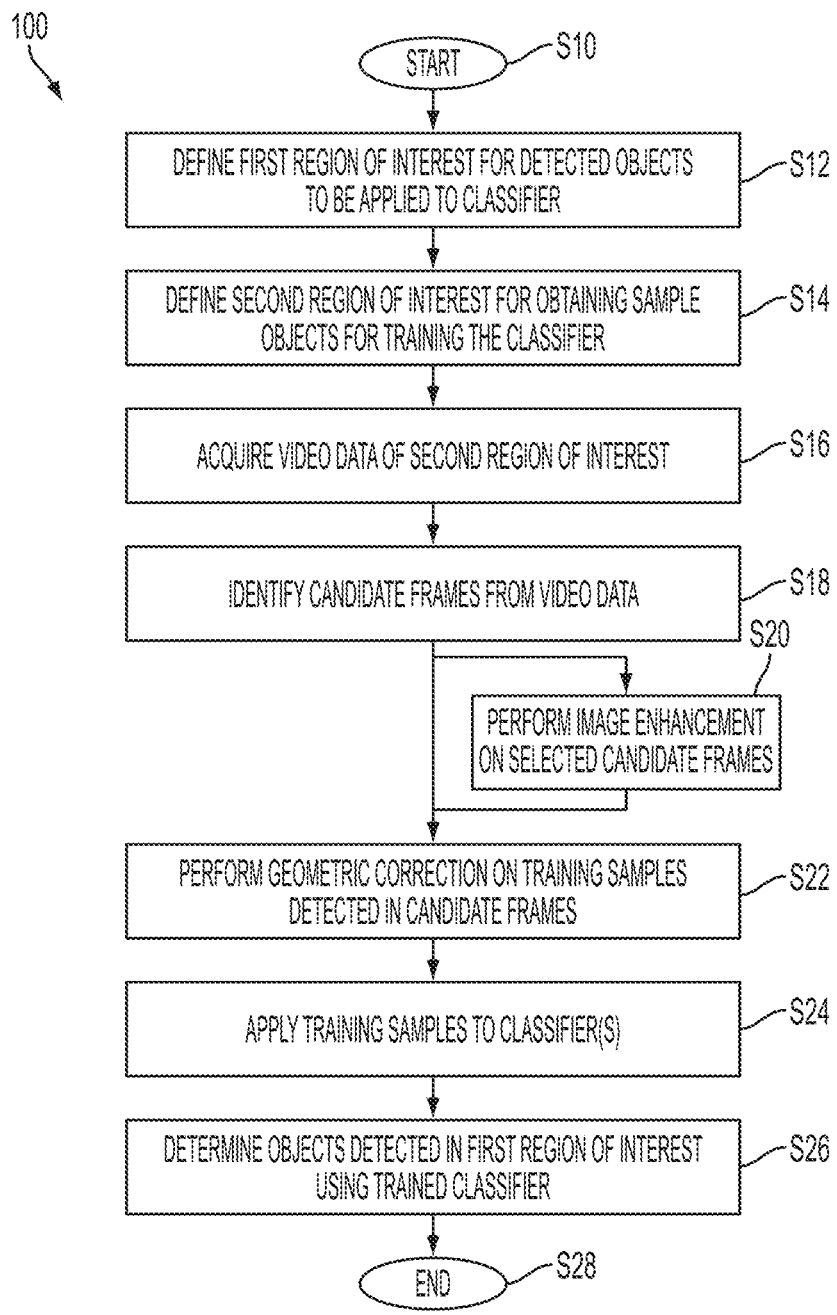
FIG. 1 shows an overview of a process for offline training of at least one classifier used in parked vehicle detection of a video-based parking occupancy detection system ("VPODS")

FIG. 1 shows an overview of a process for offline training of at least one classifier used in parked vehicle detection of a video-based parking occupancy detection system ("VPODS"). The method starts at S10. A first area is defined on the image plane for representing a parking region of interest $ROI_P$ at S12, which is or will be monitored for detecting objects and/or vehicles that will be applied to a classifier. In the discussed embodiment, the first area is a parking lane. A second area is defined on the image plane for representing a traffic region of interest region of interest $ROI_T$ at S14, which is monitored for obtaining sample objects and/or vehicles for training the classifier. In the discussed embodiment, the second area is a traffic area and, particularly, a traffic lane extending along the parking lane. However, there is no limitation made to a location of the traffic region of interest $ROI_T$. For example, the traffic region of interest $ROI_T$ can include a traffic lane at a different location removed from the parking region of interest $ROI_P$. For embodiments that follow this approach, the video capture device can be positioned to capture the traffic region of interest $ROI_T$ having a similar perspective view as the parking region of interest $ROI_P$. Video data of the second area is acquired at S16 using an image capture device included in the VPODS. The video data is processed to select candidate frames at S18, which are frames where detected objects are considered as probably including a vehicle-of-interest. In one embodiment, a vehicle-velocity aware image enhancement can be performed on portions of select frames, entire select frames, or the entire set of candidate frames at S20. The enhancement is operative to reduce image degradation caused by movement of the detected vehicles. This enhancement improves the sample vehicle features used to train the classifier, since the samples are pulled from vehicles that are typically in-motion when detected, while the vehicles subsequently being monitored in the parking area are typically stationary when detected. Similarly, a perspective correction can be performed on the training samples at S22 so that their orientation matches the expected orientation of vehicles being monitored in the parking region of interest $ROI_P$. Features of the corrected samples obtained from the traffic region of interest $ROI_T$ are then applied to at least one statistical classifier to train the classifier at S24. The classifier can be used to determine the type of stationary vehicle later detected in the parking region of interest $ROI_P$ at S26. The method ends at S28.

Figure 2:
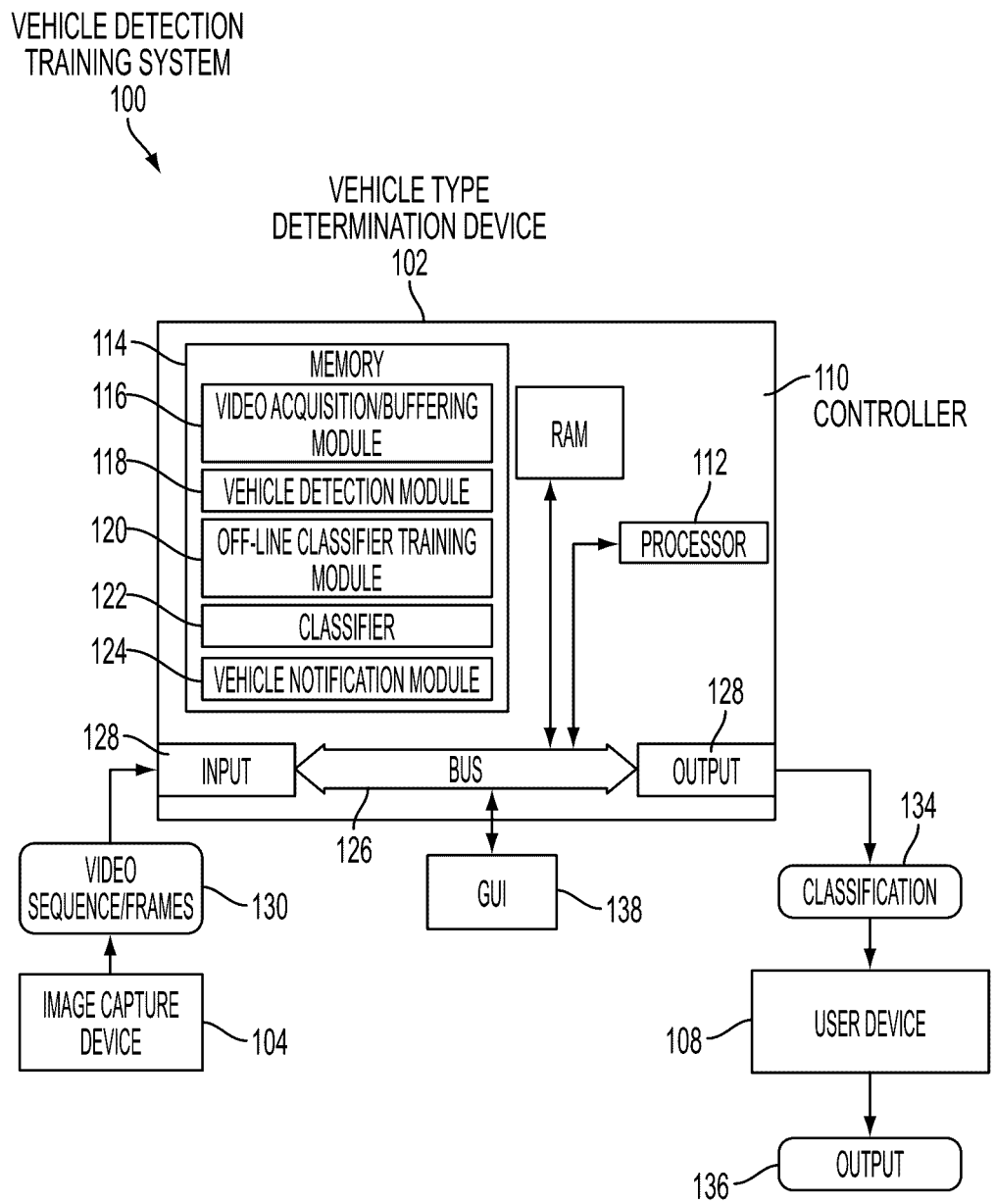
FIG. 2 is a schematic illustration of a video-based system for training a vehicle detection system used in a street occupancy estimation of stationary vehicles in one exemplary embodiment.

FIG. 2 is a schematic illustration of a video-based method and system 100 for training a vehicle detection system used in a street occupancy estimation of stationary vehicles in one exemplary embodiment. The training system includes a vehicle type determination device 102, an image capture device 104, which may be linked together by communication links, referred to herein as a network. In one embodiment, the system 100 may be in further communication with a user device 108. These components are described in greater detail below.

The vehicle type determination device 102 illustrated in FIG. 2 includes a controller 110 that is part of or associated with the device 102. The exemplary controller 110 is adapted for controlling an analysis of video data received by the system 100. The controller 110 includes a processor 112, which controls the overall operation of the device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in FIGS. 4 and 5. In some embodiments, the processor 112 and memory 114 may be combined in a single chip.

The device 102 may be embodied in a networked device, such as the image capture device 104, although it is also contemplated that the device 102 may be located elsewhere on a network to which the system 100 is connected, such as on a central server, a networked computer, or the like, or distributed throughout the network or otherwise accessible thereto. The sample vehicle detection, vehicle type determination, and classifier training stages disclosed herein are performed by the processor 112 according to the instructions contained in the memory 114. In particular, the memory 114 stores a video buffering module 116, which receives video captured from a select parking area of interest or similar ROI and a proximate second area; a vehicle detection module 118, which defines the first and second areas on the image plane, determines candidate frames that include objects in the second area, and extracts the objects; an off-line classifier training module 120, which extracts features of the detected objects, assigns labels to each extracted object, and uses the extracted features and assigned labels to train at least one classifier; a classifier 122, which uses features of a vehicle later observed in the enforced parking area to classify the vehicle as belonging to a certain vehicle type, and, a vehicle notification module 124, which notifies a user of the vehicle class of vehicles detected in the enforcement area. Embodiments are contemplated wherein these instructions can be stored in a single module or as multiple modules embodied in different devices. The modules 116-124 will be later described with reference to the exemplary method.

The software modules as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the detection device 102 may be all connected by a bus 126.

With continued reference to FIG. 2, the device 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive video and/or image data 130 as input.

The device 102 may include one or more special purpose or general purpose computing devices, such as a server computer, controller or digital front end (DFE), or any other computing device capable of executing instructions for performing the exemplary method.

FIG. 2 further illustrates the device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. The number of cameras may vary depending on a length and location of the area being monitored. It is contemplated that the combined field of view of multiple cameras typically comprehends all parking areas being monitored for training and enforcement. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the detection device 102. In another embodiment, the video data 130 may be input from any suitable source, such as a workstation, a database, a memory storage device, such as a disk, or the like. The image source 104 is in communication with the controller 110 containing the processor 112 and memories 114.

With continued reference to FIG. 2, the video data 130 undergoes processing by the vehicle type determination device 102 to output a classification 134 representing foreground objects in the $ROI_P$ detected in an incoming frame. The system 100 is operative to apply the classification to an algorithm for outputting a determination 136. In one embodiment, the system 100 can provide the user device 108 with the classification 134 for generating the output 136.

Furthermore, the system 100 can display the binary mask and/or the output in a suitable form on a graphic user interface (GUI) 138. The GUI 138 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112.

Figure 3:
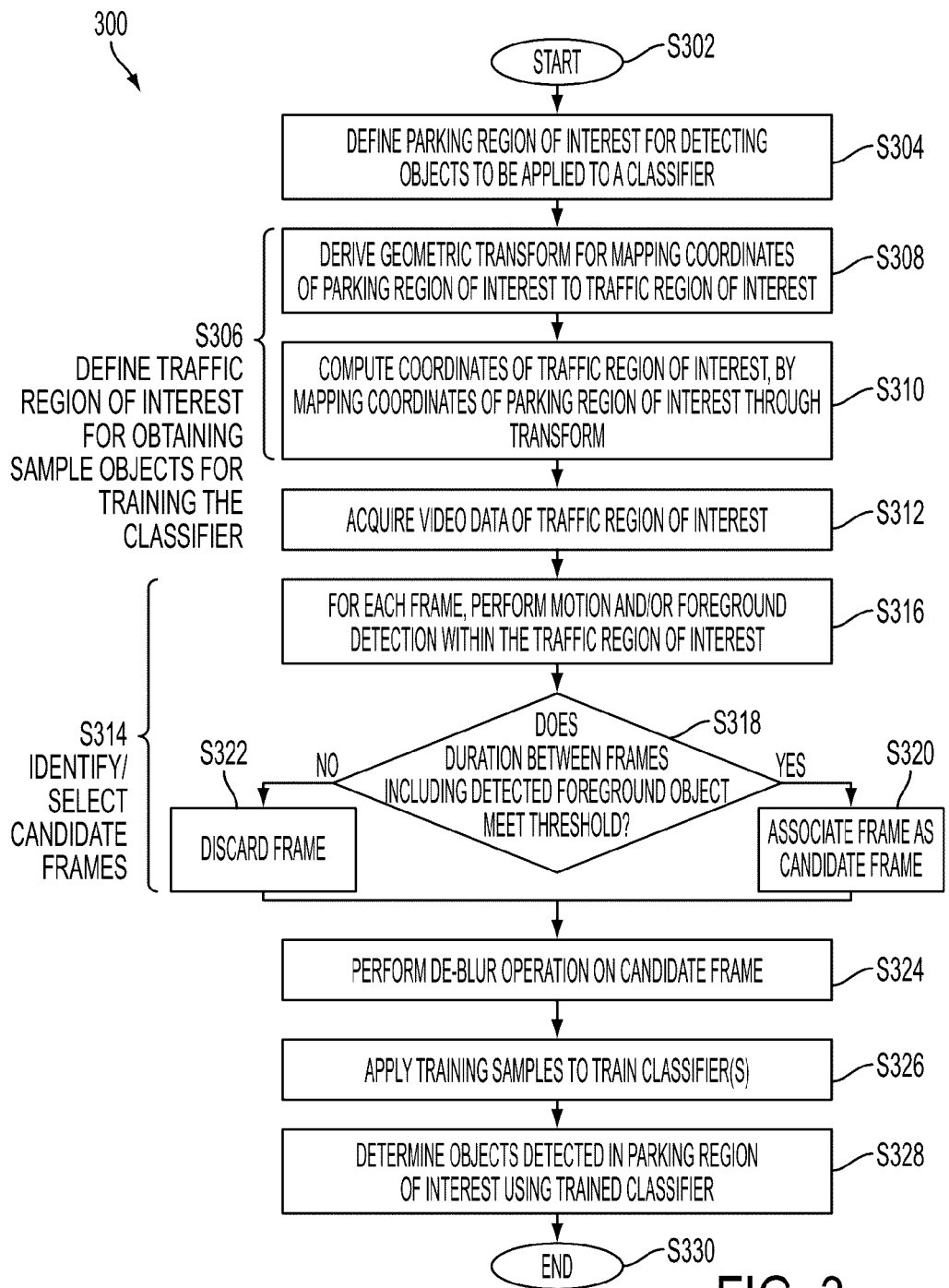
FIG. 3 is a flowchart of a video-based method and system for training a vehicle detection system used in a street occupancy estimation of stationary vehicles in one exemplary embodiment.
Figure 4A:
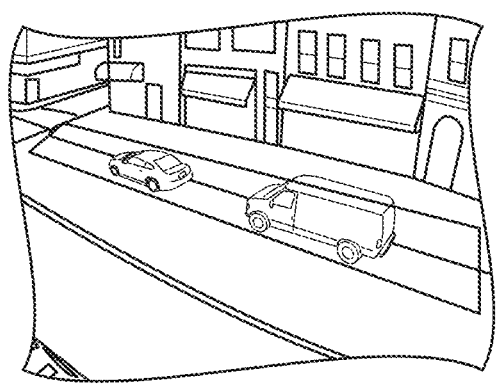
FIGS. 4A-B show example first and second region of interests including a parking lane adjacent a traffic lane, respectively.

FIG. 3 is a flowchart of a video-based method 300 for training a vehicle detection system used in a street occupancy estimation of stationary vehicles in one exemplary embodiment. The method starts at S302. A parking region of interest $ROI_P$ is defined at S304 for representing a parking area of interest on the image plane of an image capture device in communication with the video-based vehicle detection training system 100. The disclosure of co-pending and commonly assigned U.S. Ser. No. 13/922,336, entitled "A Method for Detecting Large Size and Passenger Vehicles from Fixed Cameras", filed Jun. 20, 2013", by Orhan Bulan, et al., teaches a process for defining the parking region of interest $ROP_P$ and is totally incorporated herein by reference. Similarly, the disclosure of co-pending and commonly assigned U.S. patent application Ser. No. 13/835,386, entitled "Two-Dimensional and Three-Dimensional Sliding Window-Based Methods and Systems for Detecting Vehicles", filed Mar. 5, 2013, by Orhan Bulan, et al., teaches a process for defining the parking region of interest $ROI_P$ and is totally incorporated herein by reference. FIG. 4A shows a sample parking region of interest $ROI_P$ 42 virtually represented as a box surrounding a parking lane, which in the illustrative example extends along a street curb.

Figure 4B:
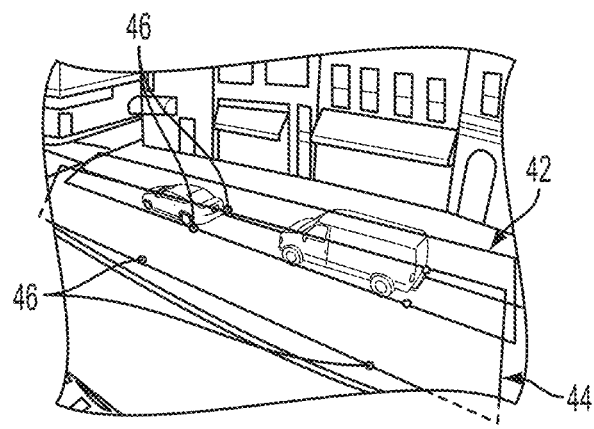

A traffic region of interest $ROI_T$ is defined at S306 for representing a traffic area adjacent to the parking area of interest $POI_P$. FIG. 4B shows a sample stream of traffic region of interest $ROI_T$ 44 virtually represented as a box surrounding a driving lane, which in the illustrative example extends along the parking lane 42. However, embodiments are contemplated to use a traffic region of interest $ROI_T$ representing a traffic lane removed from the parking lane, but simulating the traffic lane extending adjacent the parking lane. By 'simulating', the removed $ROI_T$ anticipates that similar large and/or special-type vehicles traveling in the $ROT_T$ will be detected in the parking region of interest $ROI_P$.

In one embodiment, the location of the stream of traffic across the region of interest $ROI_T$ can be defined directly in order to facilitate the derivation of a geometric transform H relating the shapes of $ROI_T$ and $ROI_P$. This approach, however, does not ensure that the poses/orientation of vehicles in the $ROI_T$ is similar to those in the $ROI_P$. Instead, the boundaries of traffic region of interest $ROI_T$ can be determined from a geometric transform $H_{road}$ applied to the boundaries of the parking region of interest $ROI_P$. Specifically, the boundaries of the $ROI_T$ can be defined or calculated by applying the geometric transform $H_{road}$ to the boundaries of the parking region of interest $ROI_P$. This approach better ensures that the poses of the vehicles in the traffic region of interest $ROI_T$ are similar to those anticipated in the parking region of interest $ROI_P$, as long as derivation of the geometric transform $H_{road}$ was performed accurately. In the discussed embodiment, the geometric transformation includes a projective transformation performed on the parking region of interest $ROI_P$. However, other geometric transformations are contemplated, such as, an affine transformation performed on a selected object, a rotation of object(s), a scaling of object(s), and a combination of the above. The projective transform is derived for mapping coordinates of the parking region of interest $ROI_P$ to coordinates of the traffic region of interest $ROI_T$ at S308. The coordinates of traffic region of interest $ROI_T$ can be computed by mapping the coordinates of the vertices of parking region of interest $ROI_P$ through the geometric transform $H_{road}$ at S310.

In one embodiment, the projective transform $H_{road}$ can be derived via camera calibration procedures (e.g., using calibration tape on both lanes, etc.). In the contemplated and illustrated embodiment, the projective transform $H_{road}$ was approximated by specifying six (6) points/dots 46 on the image plane that generally represent two adjacent rectangles (represented as virtual rectangles 42 and 44 in FIGS. 4A-B). A first rectangle represents the parking lane 42 and the second rectangle represents the adjacent traffic lane 44. The six points are specified by an operator to derive the projective transform $H_{road}$. The selection of the six dots 46 can by guided by (i) an orientation of the rear bumper of the vehicles (assuming the fenders are orthogonal to the lane orientation), (ii) an imaginary line passing through the intersection of the vehicle wheels and the ground in the parking region of interest $ROI_P$, and (iii) extrapolation to the boundary of the traffic lane. Then, the traffic region of interest $ROI_T$ 44 is the parking region of interest $ROI_P$ 42 mapped through the projective transform $H_{road}$.

The parking and traffic regions of interest ROIs are determined such that training samples can be extracted and collected from acquired video frames. Next, a video buffering module 116 receives video-data from a sequence of frames captured from the image capture device at S312. The number of useful training samples can depend on a length of the captured video and the level of activity within the traffic region of interest $ROI_T$. For example, longer video sequences may be required where there is a low traffic activity in the monitored ROI.

Continuing, using the acquired frames, the vehicle detection module 118 determines candidate frames that include objects in the traffic region of interest $ROI_T$ at S314. In the discussed embodiment, the detection of possible vehicles of interest can be performed automatically using the module 118. Particularly, in one embodiment, the module 118 performs a foreground detection process within the traffic region of interest $ROI_T$ at S316. The disclosure of co-pending and commonly assigned U.S. Ser. No. 13/441,269, entitled "A System and Method for Available Parking Space Estimation for Multispace On-Street Parking", filed Apr. 6, 2012, by Orhan Bulan, et al., teaches a foreground detection process via a background estimation and subtraction process and is totally incorporated herein by reference.

Furthermore, and in combination with the foreground detection process, the module 118 can apply a time threshold to the results. For example, in response to the duration between a current frame, including detected foreground regions, and a previous frame meeting a predetermined threshold (YES at S318), the module 118 can select the frame as a candidate frame at S320. For example the time threshold can be two (2) seconds, but no limitation is placed on it herein. In response to the duration not meeting the predetermined threshold (NO at S318), the module 118 can discard the frame being processed at S322. Other parameters can furthermore be placed on the selection of candidate frames. For example, the module 118 may require the results of the foreground detection process to include a predetermined number of foreground objects. In one embodiment, this predetermined number can be greater than one.

In a different embodiment, the candidate frames can be selected by performing a motion detection algorithm on the acquired video. In this approach, a frame difference is calculated at each frame—followed by morphological operations—to detect motion in the traffic region of interest $ROI_T$. The size of detected objects corresponding to detected motion regions is then compared with a size threshold and time threshold, as described above, to determine the candidate frames.

In yet another embodiment, stationary vehicles in the traffic region of interest $ROI_T$ can be detected by using a foreground detection algorithm incorporated with a motion detection algorithm. In such an embodiment, for example, the candidate frames can be determined only when there is a stationary vehicle in the traffic region of interest $ROI_T$, where moving vehicles is otherwise expected. An instance when this might occur is when a stationary vehicle is detected in the traffic lane as consequence of a traffic light or congestion. In this embodiment, a frame is identified as a candidate frame when the foreground detection algorithm detects an object in the traffic region of interest $ROI_T$ and the motion detection algorithm simultaneously does not detect motion within the detected foreground object and/or region.

In this approach, the positive samples later extracted from the candidate frames can more closely resemble the vehicles in the parking region of interest $ROI_P$, in terms of motion blur. The system expects the number of stationary vehicles detected in the traffic lane to be lower than the number of all the (moving and stationary) vehicles passing through the traffic lane, which can increase the processing time in the offline phase.

In the discussed embodiment, however, where the candidate frames are identified by detecting changes between the current and background frames as moving objects, the vehicles and/or objects of interest within the traffic region of interest $ROI_T$ may be affected by motion blur. In other words, the samples that are obtained from the traffic region of interest $ROI_T$—for training the classifier—may be blurrier than the stationary vehicles obtained from the parking region of interest $ROI_P$ and applied to the classifier. Therefore, a de-blur operation can be performed on the detected object at S324 so that the sample vehicles more closely resemble and/or match the appearance of the anticipated stationary vehicles. The disclosure of co-pending and commonly assigned U.S. Ser. No. 13/932,453, entitled "System and Method for Enhancing Images and Video Frames", filed Jul. 1, 2013, by Bernal, et al., teaches a de-blurring approach and is totally incorporated herein by reference.

In the embodiment discussed above where candidate frames are selected when stationary vehicles are detected in the traffic region of interest $ROI_T$, the de-blur operation can be bypassed since the detected vehicle is not in motion when it is detected.

One aspect of the present disclosure is that the training and use of a statistical classifier that is trained using samples obtained from a surrogate environment. Accordingly, potential discrepancies are remedied in the vehicles detected in the candidate frames so that the training samples more closely match the appearance of the anticipated stationary vehicles. Particularly, the pose and/or orientation of the vehicles detected in the candidate frame are adjusted. In a first approach where the testing is not performed in a perspective-corrected space, a single perspective transformation describing the perspective change of vehicles from the traffic region of interest $ROI_T$ to the parking region of interest $ROI_P$ is applied. In a second approach where the testing is performed in a perspective-corrected space (e.g., when a camera view is oblique relative to the ROI), two cascaded transformations or a single composite transformation can be applied to map the perspective of the traffic region of interest $ROI_T$ to that of the corrected space.

Returning to FIG. 3, the candidate frames are provided to the off-line classifier training module 120, which trains a classifier at S326. The disclosure of co-pending and commonly assigned U.S. Ser. No. 13/922,336, entitled "A Method for Detecting Large Size and Passenger Vehicles from Fixed Cameras", filed Jun. 20, 2013, by Bulan, et al., is totally incorporated herein by reference.

Figure 5:
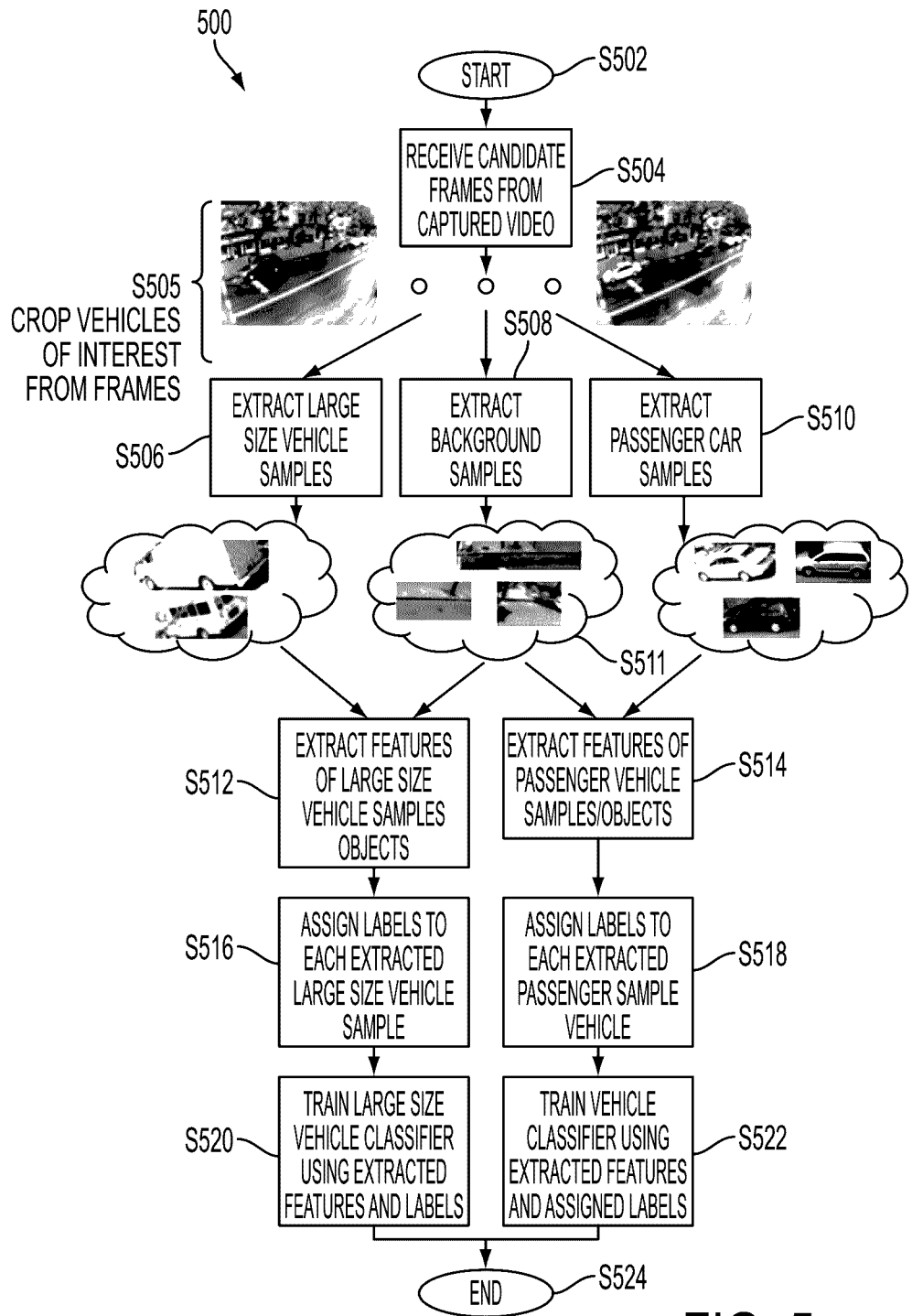
FIG. 5 is a flowchart for describing an offline training process performed as part of a first (offline) phase of the disclosure.

Now referring to FIG. 5, a method 500 for training the classifiers is shown. The method starts at S502. The training module 120 receives the candidate frames at S504. In one embodiment, the system can provide an operator with the candidate frames selected at S320 in FIG. 3. It is anticipated that the operator can use a video player to scan through the candidate frames to further select frames where newly parked vehicles appear.

In one embodiment, the vehicles of interest can be further (manually or automatically) cropped out of the selected frames to form the set of positive training samples at S505. In one embodiment, the operator can crop the images using the GUI 138.

The module 120 extracts from the selected frames the detected objects as samples of at least one vehicle of interest. In an example embodiment, these vehicles of interest may include multiple classes of vehicles including larger-size vehicle samples (such as buses, trucks, etc.) at S506 and passenger vehicle samples at S510. Furthermore, the module 120 can extract video frames that include at least one region without a vehicle of interest and background samples (i.e., non-vehicles) at S508. The background samples include the patches from the region of interest without a vehicle. Furthermore, the regions that do not fully include a vehicle of interest (i.e., background image without any vehicle or image with non-significant portion of vehicle) can be cropped out of the selected frames, as shown at S511 in FIG. 5, to form the set of negative training samples.

The samples can be extracted at S506-S511 either manually from the frames or automatically via a combination of motion/foreground detection in video processing and random cropping. Note that since the extraction of negative samples can be achieved via a combination of motion/foreground detection in video processing and random cropping (unlike those for positive samples that require precise cropping to the edges of vehicles of interest), it can be advantageous to extract these negative samples directly from the parking region of interest $ROI_P$ rather than using the surrogate traffic region of interest $ROI_T$. In one embodiment, the samples can be extracted using a hierarchical training approach provided in co-pending and commonly assigned U.S. patent application Ser. No. 13/836,310, filed Mar. 15, 2013, entitled "Methods And System For Automated In-Field Hierarchical Training Of A Vehicle Detection System", by Wu et al., which is totally incorporated herein by reference.

Once a sufficient set of samples are collected for each class of vehicles, at least two classifiers are trained using a classical, supervised machine learning approach. The illustrated embodiment in FIG. 5 trains two classifiers, but embodiments are contemplated for training any desired number of classifiers. The module 120 applies a machine learning method to train a classifier. In the discussed embodiment, a first vehicle type (e.g., commercial vehicle or any desired special-type vehicle) classifier is trained using the larger-sized vehicles and background samples. Similarly, the second vehicle-type (passenger vehicle or any desired special-type vehicle) classifier is trained using the passenger car and background samples. To train the classifiers, a set of features are extracted from each of the collected samples. More specifically, features of the larger-sized vehicle samples are extracted for the first vehicle type classifier at S512 and features of the passenger vehicle samples are extracted for the second vehicle type classifier at S514. These features can be extracted using a conventional approach including, but not limited to, a dimensionality reduction technique, such as principal component analysis (PCA) or linear discriminant analysis (LDA) and the features can include, but are not limited to, texture-based features, such as histogram of oriented gradients (HOG), local binary patterns (LBP), or successive mean quantization transform features (SMQT); features based on color attributes (e.g., color histograms); scale invariant features such as scale invariant feature transform (SIFT) features or speeded up robust features (SURF); and local image descriptors, such as bag of visual words (BOV) or Fisher vectors.

Continuing, labels are assigned to each sample using the extracted vehicles. More specifically, labels are assigned to each extracted large vehicle sample using the extracted features of the larger-sized vehicle samples at S516 and labels are assigned to each extracted passenger vehicle sample using the extracted features of the passenger vehicle samples at S518. The first classifier is trained using the extracted features and labels of the larger-sized vehicle samples at S520 and the second classifier is similarly trained using the extracted features and labels of the passenger vehicles at S522.

Any combination of the above-listed features can be used to generate a final feature vector. A linear/non-linear classifier, such as linear Support Vector Machine (SVM), can be trained by feeding the select features extracted from a set of training samples (for the select vehicle type) and labels of the training samples to the classifier. Other trainable classifiers including those based on clustering techniques, neural networks and decision trees can be used. The method ends at S524.

Returning to FIG. 3, the system 100 uses the at least one trained classifier 122 to classify a stationary vehicle detected in the parking region of interest $ROI_P$ at S328. More specifically, the system uses the image capture device 104, or a second image capture device, to monitor the parking area for outputting a determination desired by a selected computer application. For example, the parking area may be monitored to estimate vehicle occupancy or detect an availability and/or size of parking spaces, any of which may require the type of the stationary vehicles parked in the area be identified. Generally, it is anticipated that the parking area (parking region of interest $ROI_P$) is a regulated enforcement area. The classification can be transmitted to the notification module 124, which outputs a notification to a user of the vehicle class of vehicles detected in the parking area. The method ends at S330.

The present disclosure provides a simpler and more effective way to collect positive samples for offline training of vehicle classifiers. One aspect of using surrogate (positive) training samples extracted from a traffic lane neighboring a parking lane is a decrease in the time required for off-line training of a special-type parked vehicle classifier. The training time is decreased because a greater number of the special-type vehicles, such as trucks for example, transit the traffic lane than park in the parking lane. Furthermore, because the sample training vehicles are generally detected while in motion, the previous process for determining candidate frames—i.e., by manually scanning through long videos—is replaced with automated motion/foreground detection techniques. The process disclosed herein reduces the manual effort while yielding a desired increase in training efficiency without degrading the quality of the classifier.

While the present disclosure illustrates efficiency gains in the training of special-type vehicle classifier(s), the methodology can equally be applied to speed up training of other classifiers, including the passenger vehicle classifier.

Although the control method 100, 300, 500 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for training a vehicle detection system used in a street occupancy estimation of stationary vehicles, the method comprising:
    defining first and second areas on an image plane of at least one image capture device associated with monitoring for detection of vehicles, wherein the first area includes an on-street parking lane and the second area includes a traffic lane adjacent to the on-street parking lane;
    receiving video-data from a sequence of frames captured from the image capture device;
    determining candidate frames that include sample objects relevant to a classification task in the second area;
    extracting the sample objects from the candidate frames;
    extracting features of each extracted sample object;
    assigning labels to the each extracted sample object;
    training at least one classifier using the extracted features of the labeled objects; and,
    using the at least one trained classifier to classify a vehicle class of a stationary vehicle detected in the first area.

2. The method of claim 1, further comprising:
    assign a label of the each extracted object based on an attribute of the extracted object.

3. The method of claim 2, wherein the attribute is selected from a group consisting:
    size;
    shape;
    orientation;
    aspect ratio; and,
    a combination of the above.

4. The method of claim 1, wherein the extracting the objects further comprise:
    performing a geometric transformation on the objects detected in the second area to match an appearance of the objects in the first area.

5. The method of claim 1, wherein the defining the second area includes:
    deriving a geometric transformation suitable to map the first area coordinates to coordinates of the second area;
    computing the coordinates of the second area by mapping the coordinates of the vertices of the first area through the geometric transformation.

6. The method of claim 4, wherein the geometric transformation is selected from a group consisting:
    a projective transformation performed on the objects;
    an affine transformation performed on the objects;
    a rotation of the objects;
    a scaling of the objects; and,
    a combination of the above.

7. The method of claim 1, wherein the determining the candidate frames is performed using a foreground detection process via a background estimation and subtraction process.

8. The method of claim 1, wherein the determining the candidate frames includes:
    detecting motion in the second area between frames;
    identifying a group of pixels associated with the detected motion;
    comparing a size of the group of pixels to a predetermined threshold; and,
    in response to the size meeting the threshold, classifying the frames as candidate frames.

9. The method of claim 1 further comprising:
    performing blur correction on the extracted objects.

10. The method of claim 1, wherein the extracting the objects includes cropping a group of pixels defining the objects out of the candidate frames.

11. A system for training a vehicle detection system used in a street occupancy estimation of stationary vehicles, the system comprising a computer including a memory and a processor adapted to execute:
    a video buffering module operative to receive video-data from a sequence of frames captured from the image capture device;
    a vehicle detection module operative to:
        define first and second areas on an image plane of an image capture device associated with monitoring for detection of vehicles, the first area including an on-street parking lane and the second area including a traffic lane adjacent to the on-street parking lane;
        determine candidate frames that include objects relevant to a classification task in the second area, and extract the objects from the candidate frames;
    a training module operative to:
        extract features of each extracted object, assign labels to the each extracted object, and
train at least one classifier using the extracted features of the labeled objects; and,
the classifier operative to classify a vehicle class of a stationary vehicle detected in the first area.

12. The system of claim 11, wherein the training module is further operative to:
assign a label of the each extracted object based on an attribute of the extracted object.

13. The system of claim 11, wherein the vehicle detection module is further operative to:
perform a geometric transformation on the objects detected in the second area to match an appearance of the objects in the first area.

14. The system of claim 11, wherein the vehicle detection module is further operative to:
determine the candidate frames by deriving a geometric transformation suitable to map the first area coordinates to coordinates of the second area;
compute the coordinates of the second area by mapping the coordinates of the vertices of the first area through the geometric transformation.

15. The system of claim 11, wherein the vehicle detection module is further operative to:
determine the candidate frames using a foreground detection process via a background estimation and subtraction process.

16. The system of claim 11, wherein the vehicle detection module is further operative to:
detect motion in the second area between frames;
identify a group of pixels associated with the detected motion;
compare a size of the group of pixels to a predetermined threshold; and,
in response to the size meeting the threshold, classify the frames as belonging to candidate frames.

17. The system of claim 11, wherein the training module is further operative to:
perform blur correction on the extracted objects.

18. The system of claim 11, wherein the vehicle detection module is further operative to:
crop a group of pixels defining the objects out of the candidate frames.

* * * * *